United States Patent [19]
Oshnock et al.

[11] Patent Number: 5,829,924
[45] Date of Patent: Nov. 3, 1998

[54] CUTTING TOOL WITH INSERT CLAMPING MECHANISM

[75] Inventors: Robert E. Oshnock, Apex; Robert A. Erickson, Raleigh, both of N.C.

[73] Assignee: Kennametal Inc., Latrobe, Pa.

[21] Appl. No.: 530,494

[22] Filed: Sep. 19, 1995

[51] Int. Cl.⁶ .................................................. B23B 27/16
[52] U.S. Cl. ........................................ 407/110; 407/117
[58] Field of Search .................................... 407/110, 111, 407/115, 117

[56] References Cited

U.S. PATENT DOCUMENTS

| | | | |
|---|---|---|---|
| 4,604,004 | 8/1986 | Armbrust | 407/117 X |
| 4,909,677 | 3/1990 | Noguchi et al. | |
| 5,085,541 | 2/1992 | Simpson, III | |
| 5,150,992 | 9/1992 | Freidmann | |
| 5,156,502 | 10/1992 | Satran | 407/117 X |
| 5,161,920 | 11/1992 | Zinner | |
| 5,288,180 | 2/1994 | Hedlund | |
| 5,342,151 | 8/1994 | Friedmann | 407/117 X |
| 5,346,335 | 9/1994 | Harpaz et al. | 407/117 X |
| 5,439,327 | 8/1995 | Wertheim | 401/117 X |

OTHER PUBLICATIONS

PCT International Search Report.

*Primary Examiner*—Andrea L. Pitts
*Assistant Examiner*—Henry W. H. Tsai
*Attorney, Agent, or Firm*—John J. Prizzi

[57] ABSTRACT

A cutting tool assembly (1) clamping mechanism (5) which secures a cutting insert (3) for performing cutoff, grooving, slotting, and profiling operations. The clamping mechanism (5) has resilient upper and lower clamping jaws (7, 9) for receiving and securing the insert (3). The cutting insert (3) has front and top faces (13, 15) that define a cutting edge (21) at an intersection thereof, a back face (25), and adjacent proximal and distal bottom faces (27, 29) contiguous with said front and back faces (13, 25) that define an angular lower seating portion (30). The lower clamping jaw (9) of the clamping mechanism (5) includes proximal and distal pocket surfaces (59, 67) forming an angularly recessed jaw portion that is complementary in shape to the angular seating portion (30) of the insert (3). The distal pocket surface (67) of the lower clamping jaw (9) is oriented with the proximal pocket surface (59) to form a stop for limiting the extent that the insert (3) may be received between the clamping jaws (7, 9). This orientation further redirects a component of the cutting force (F) on the insert (3) toward the top face (15) thereof in order to wedgingly engage the top face (15) of the insert (3) against the top pocket surface (45) of the upper clamping jaw (9), thereby enhancing the clamping force that the jaws (7, 9) apply to the insert (3).

21 Claims, 5 Drawing Sheets

CUTTING TOOL WITH INSERT CLAMPING MECHANISM

BACKGROUND OF THE INVENTION

This invention is generally concerned with a cutting tool having a clamping mechanism for resiliently retaining a replaceable cutting insert, and is specifically concerned with such a tool capable of cutoff, grooving, slotting, and profiling operations wherein the cutting insert and the clamping mechanism have complementary seating and pocket portions for enhanced clamping stability.

Cutting tools comprising a cutting insert which is detachably secured to a toolholder are well known in the prior art. Such tools may be used in machining operations where the workpiece is rotated relative to the cutting insert to groove, slot, profile or even cut off the workpiece by forcefully engaging the cutting edge of the insert against the rotating workpiece. In order to maintain a high level of accuracy in such machining operations, it is necessary to both positively position the insert in its place in the toolholder during installation and to maintain the insert securely within its place during a machining operation. For this purpose, a retaining screw that extends through a bore in the insert is sometimes used. Alternatively, a screw operated clamping mechanism that secures the insert via a vice-like structure may be used.

While such screws and clamping mechanisms are certainly capable of adequately securing an insert to such a toolholder, they can interfere with certain cutting operations, such as deep grooving, where it is necessary to extend the body of the insert within the cut being made in the workpiece. In such an operation, where the retaining screw or clamping mechanism exceeds the width of the cutting edge of the insert, mechanical interference will result since the screw or clamping mechanism cannot fit in the cut being made in the workpiece. Additionally, the use of such retaining screws and clamping mechanisms makes it difficult to rapidly exchange one cutting insert for another with the toolholder. This is a significant drawback, since the insert must be changed periodically due to wear.

Because of these drawbacks, toolholder assemblies utilizing clamping mechanisms were developed. Such toolholder assemblies typically comprise a blade-like toolholder having a width less than the cutting edge of the insert to allow the insert to be deeply extended into the rotating workpiece without interference. A pair of integrally formed clamping jaws resiliently retain the upper and lower edges of an insert without the need for screws. In such devices, the cutting insert may be rapidly installed within or removed from the clamping mechanism by manually inserting or withdrawing the insert between the jaws of the mechanism. During a machining operation, the retaining force between the insert and the jaws is enhanced by the pressure applied to the insert by the workpiece, which tends to push the insert farther down within the jaws of the clamping mechanism.

While such clamping cutting tools have proven their utility in extending the depth of cut and in greatly expediting the process of exchanging cutting inserts in the toolholding mechanism, the inventors have observed at least two limitations in such prior art devices that have prevented them from realizing their full potential. First, while such devices must have some kind of provision for positively preventing the insert from sliding any further within the clamping jaws after it has been slid between the jaws the desired extent, the inventors have observed that the relative size of the stop surfaces between the insert and the jaws that are dedicated to this purpose are often small relative to the overall interface between the insert and the jaws. The use of such small stop surfaces can in turn compromise the ability of the clamping mechanism to arrest the insert at a desired point along the path of its insertion which in turn can degrade the quality and accuracy of the resulting cuts in the workpiece.

Second, the inventors have observed that such prior art clamping mechanisms sometimes fail to adequately secure the insert between the clamping jaws when large lateral forces are applied to the insert, as may occur, for example, incident to a profiling operation. Some prior art designs have attempted to achieve the desired lateral stability by the provision of interfitting V-shaped grooves and rails between the clamping jaws and the pocket surfaces of the inserts. However, the overall length of the interfitting V-rails and grooves is simply inadequate to maintain the desired lateral stability when certain cutting operations are performed. Other prior art designs have attempted to increase lateral stability (or "side load stiffness" as it is known in the art) by the provision of interfitting V-grooves and rails between the back face of the insert and the back surface of the jaws. While such a design does increase the side load stiffness of the insert within the clamping mechanism, because the back surface must now contact the back face of the insert, the "C" shaped recess that is normally present at the base of the jaws is eliminated and the resiliency of the upper and lower jaws is reduced. This reduced resiliency makes it difficult to manually install or remove the insert between the jaws and additionally increases the amount of time necessary to effect an insert change. Worse yet, the stresses generated in the clamping mechanism from the insert changing operations can lead to the cracking and failure of the metal holding the upper and lower jaws together.

Clearly, there is a need for an improved, clamping cutting tool that provides a positive stop surface between the insert and the clamping jaws in order to prevent the accuracy of the resulting cuts from being compromised. Ideally, such an improved cutting tool should provide sufficient side load stiffness to the insert between the clamping jaws so that it does not move relative to the clamping jaws even during profiling operations where the insert experiences unusually large lateral forces. Finally, such side load stiffness should be achieved without reducing the resiliency between the upper and lower jaws of the clamping mechanism so that the insert can be manually installed or removed without generating potentially damaging stresses to the clamping mechanism.

SUMMARY OF THE INVENTION

Generally speaking, the invention is a cutting tool assembly for performing cutoff, grooving, slotting, and profiling tool operations on a rotating workpiece having a clamping mechanism for resiliently holding exchangeable cutting inserts that overcomes the aforementioned shortcomings associated with the prior art.

The cutting tool assembly of the invention comprises a polygonal insert having front and top faces that define a cutting edge at an intersection thereof, a back face, and adjacent proximal and distal bottom faces contiguous with the front and back faces that define a lower angular seating portion, and a clamping mechanism including upper and lower clamping jaws for resiliently receiving and securing the insert. The lower clamping jaw includes proximal and distal pocket surfaces that form a complementary angular jaw portion for receiving the angular lower seating portion of the insert.

The distal pocket surface is oriented transversely to the force applied to the insert cutting edge during a cutting operation, and provides a stop for limiting the extent that the insert may be received within the clamping jaws. As the length of the distal bottom face of the insert is between 60% to 80% of the proximal bottom face, the distal pocket surface provides a substantial stopping force between the insert and the clamping mechanism.

The relative angle of the distal pocket surface with the proximal pocket surface is chosen to redirect a component of the cutting force to the upper portion of the insert in order to wedgingly engage the top face of the insert against a pocket surface present in the upper clamping jaw, thereby enhancing the lateral clamping forces that the jaws apply to the insert.

To further increase the lateral clamping forces between the cutting insert and the clamping mechanism, complementarily-shaped V grooves and rails are provided between all three of the pocket surfaces of the upper and lower clamping jaws, and the top and bottom faces of the cutting insert. The resulting side load stiffness of the insert renders the tool assembly of the invention particularly well adapted for performing profiling operations which exert relatively large lateral forces between the insert and the surrounding clamping mechanism.

A cut-out portion is provided between the junction of the upper and lower clamping jaws for providing enhanced jaw resiliency. The enhanced resiliency that the cut-out portion provides for the clamping jaws, allows a positive clamping action between these components of the tool assembly to be achieved by the application of a minor amount of manual force on the insert.

The pocket surface of the upper clamping jaw may be inclined between about 2° and 10° with respect to the proximal pocket surface of the lower clamping jaw so that the upper and lower jaws wedgingly secure the insert therebetween when the insert is manually pushed between the resilient jaws. Finally, the upper clamping jaw includes a tapered proximal end for facilitating chip removal as well as access of coolant to the interface between the cutting edge and a moving workpiece.

BRIEF DESCRIPTION OF THE SEVERAL FIGURES

Figure 9:
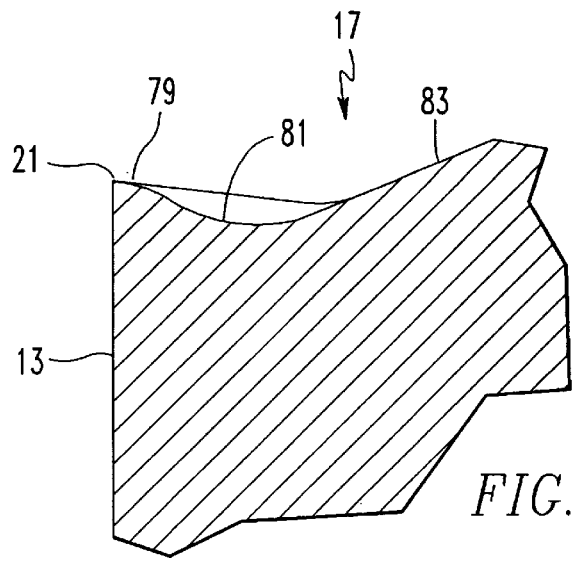
Figure 10:
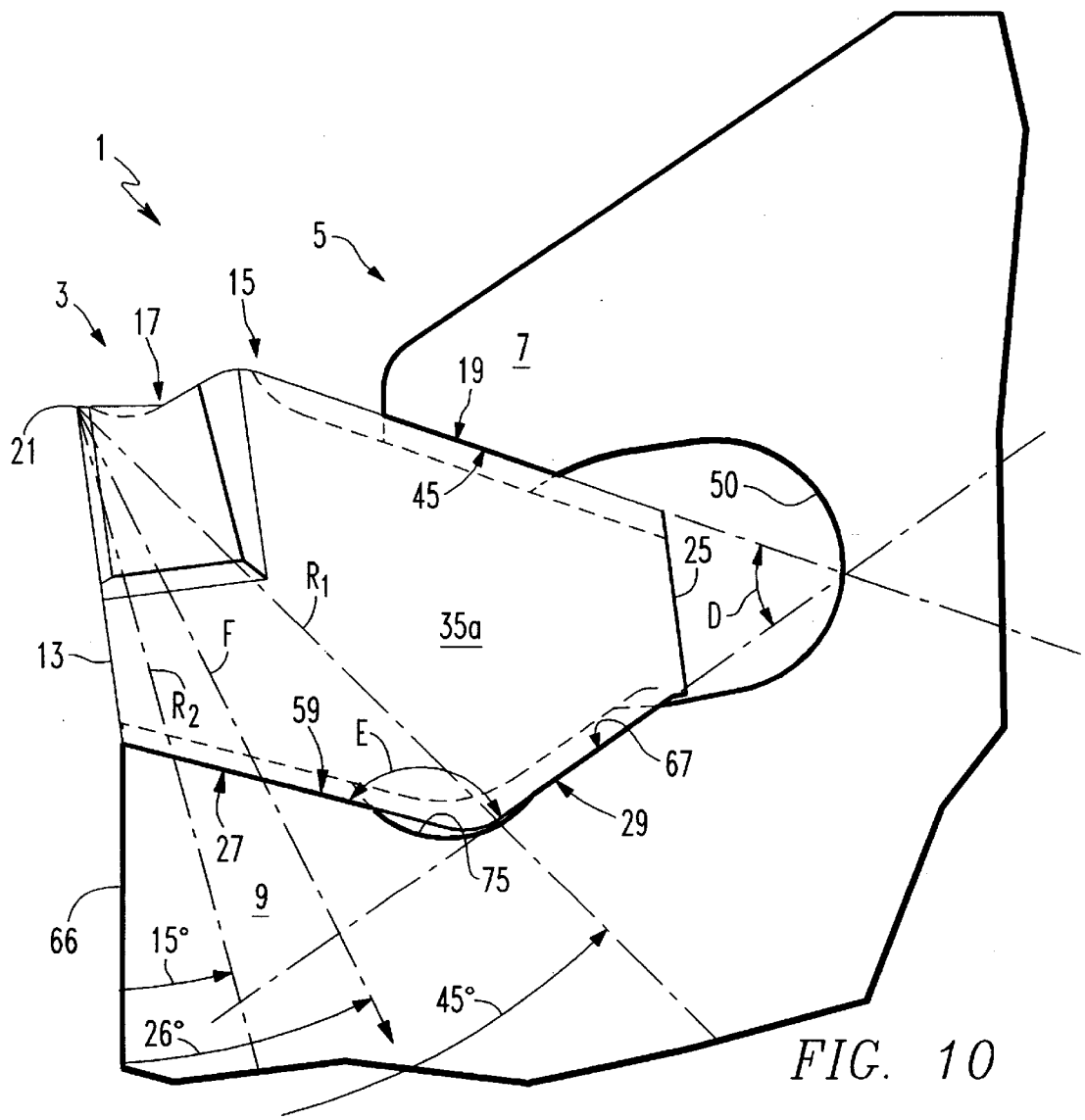

FIG. 9 is an enlarged cross-sectional side view of the proximal portion of the top face of the cutting insert illustrating the profile of the chip breaking groove behind the cutting edge of the insert, and FIG. 10 is a side view of the cutting tool assembly of the invention, illustrating how the cutting insert fits between the upper and lower jaws of the clamping mechanism, and further illustrating the range of angles of a cutting force applied to the insert during a cutting operation relative to the distal pocket surface of the lower jaw of the clamping mechanism.

DETAILED DESCRIPTION OF THE PREFERRED EMBODIMENTS

Figure 1:
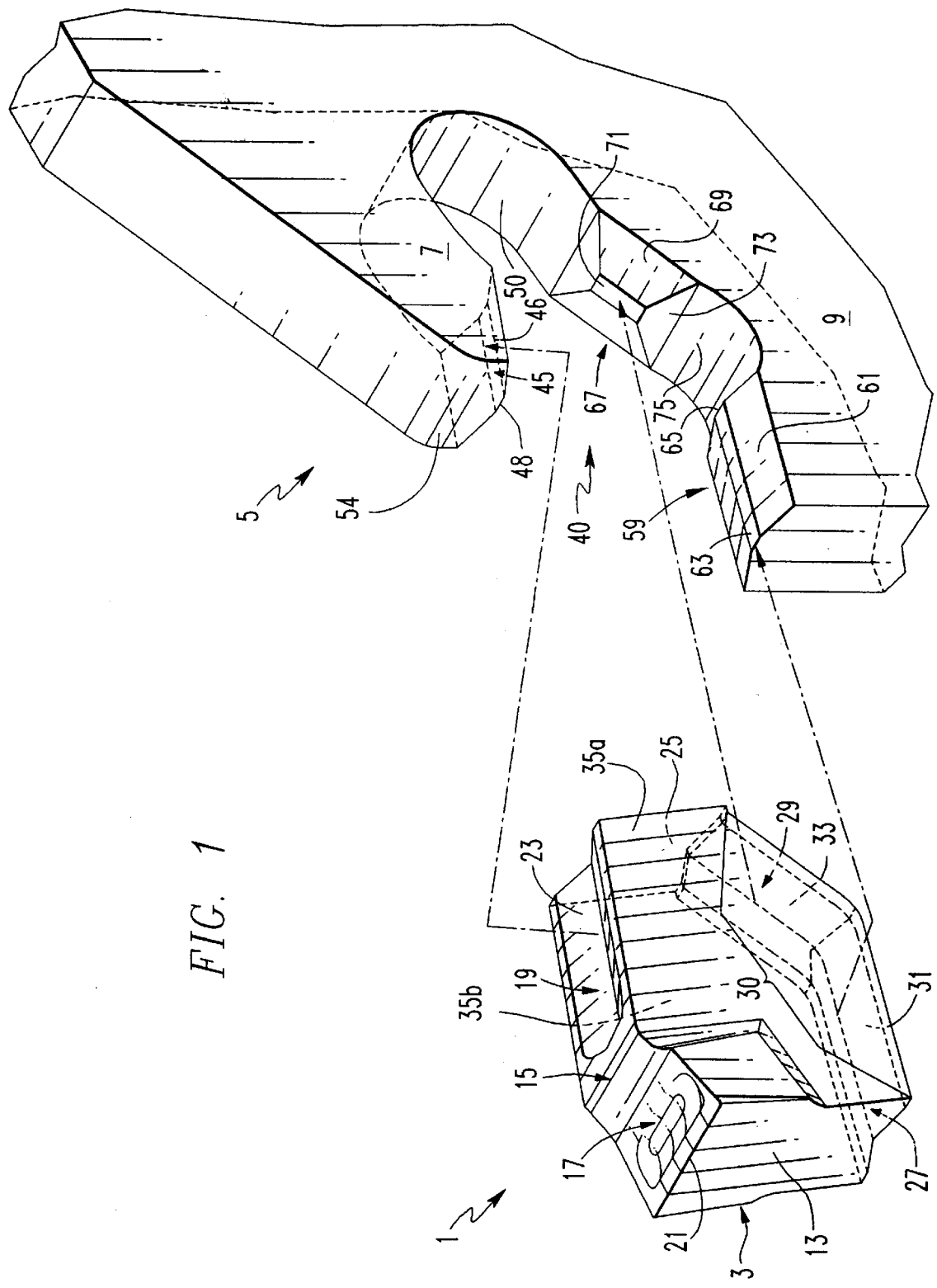
FIG. 1 is an exploded perspective view of the cutting tool assembly of the invention, illustrating how a cutting insert is received between the upper and lower jaws of a clamping mechanism.
Figure 2:
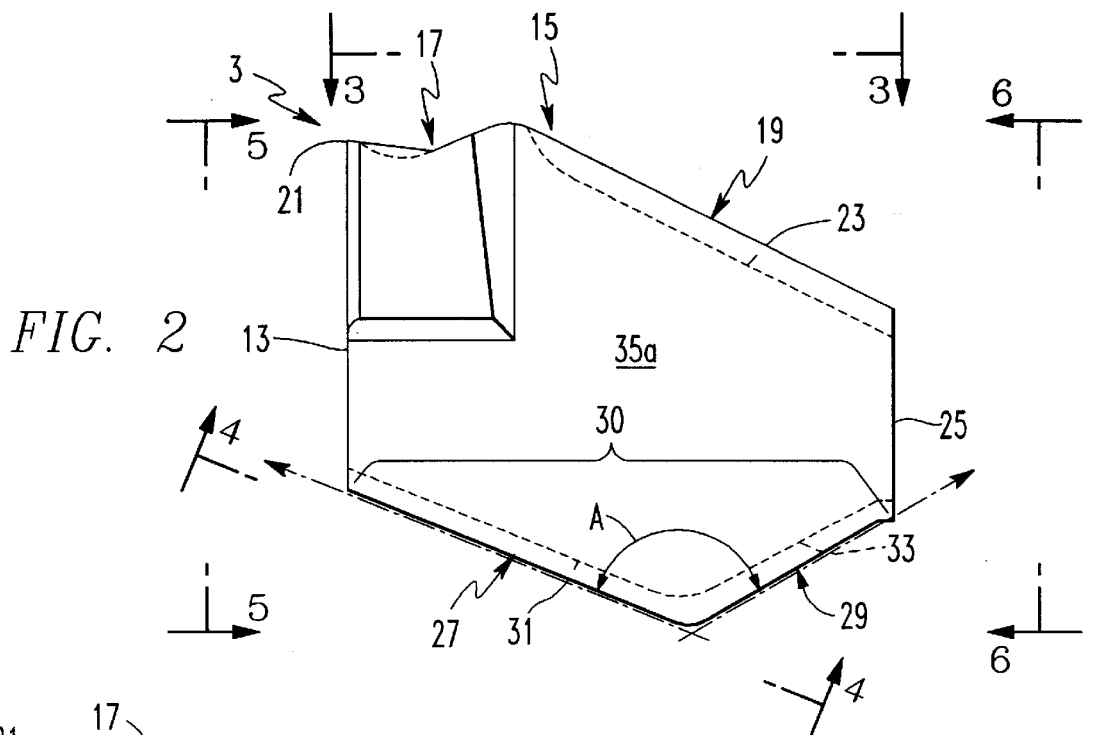
FIG. 2 is a side view of the cutting insert used in the cutting tool assembly of the invention.
Figure 3:
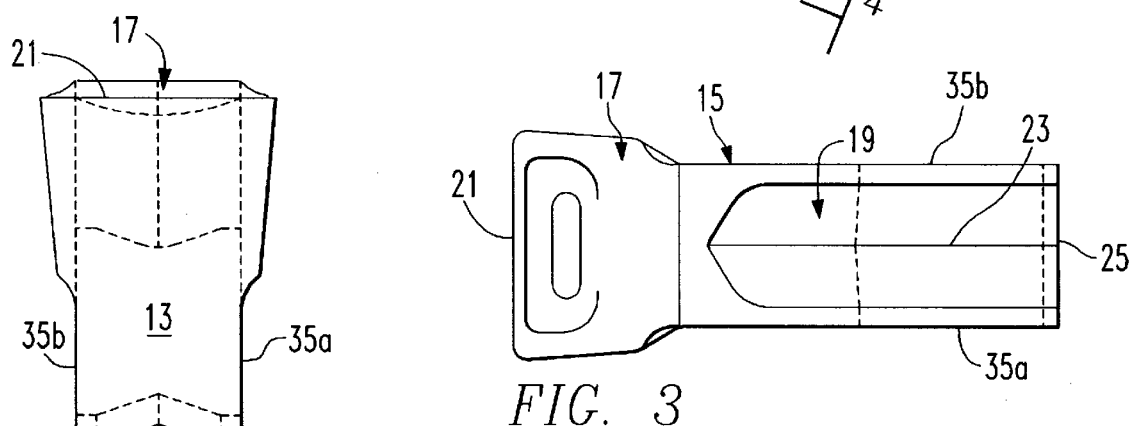
FIG. 3 is a top plan view of the insert illustrated in FIG. 2 along the line 3—3.
Figure 5:
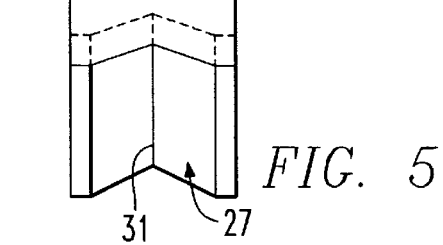
FIG. 5 is a front view of the insert illustrated in FIG. 2 along the line 5—5.
Figure 4:
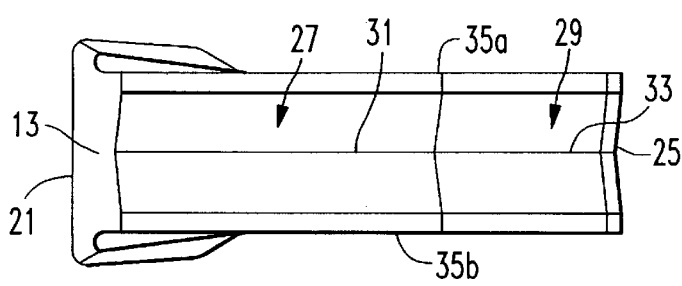
FIG. 4 is a bottom plan view of the insert illustrated in FIG. 2 along the line 4—4.

With reference to FIG. 1, wherein like components represent like components throughout all the several figures, the cutting tool assembly 1 of the invention generally comprises a polygonally shaped cutting insert 3 that is receivable in and withdrawable from a clamping mechanism 5. As will be discussed in more detail hereinafter, the insert is securely and resiliently retained between an upper jaw 7 and a lower jaw 9 of the clamping mechanism 5 without the need for clamping screws or screw-operated insert clamps.

Figure 6:
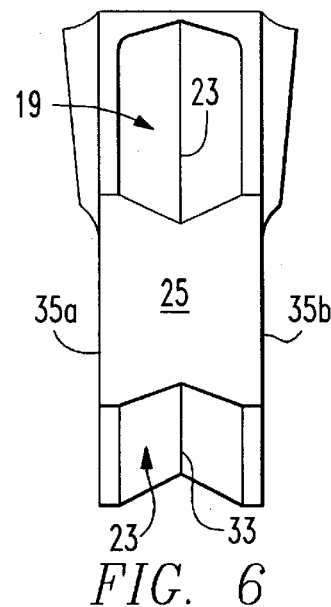
FIG. 6 is a back view of the insert illustrated in FIG. 2 along the line 6—6.

With reference to FIGS. 2 through 6, the cutting insert 3 of the invention includes a front face 13, and a top face 15 having a proximal portion 17 that slopes forwardly as shown, as well as a distal portion 19 that slopes backwardly. A cutting edge 21 is defined between the proximal portion 17 of the top face 15, and the front face 13. The distal portion 19 of the top face 15 includes a shallow, V-shaped groove 23 whose profile is best seen in FIG. 6. The V-shaped groove 23 extends between the proximal portion 17 of the top face 15 and the back face 25 of the insert 3.

The insert 3 further includes a proximal bottom face 27 that interconnects with a distal bottom face 29 to form a projecting, angular seating portion 30. The opposite ends of the proximal and distal bottom faces 27 and 29 are contiguous with the front face 13 and back face 25 respectively. Like the previously discussed distal portion of the top face 15, the proximal and distal bottom faces 27 and 29 each include shallow V-shaped grooves 31,33 respectively. The profiles of these grooves 31,33 may best be seen in FIGS. 5 and 6, respectively.

In the preferred embodiment, the angle A between the proximal and distal bottom faces 27 and 29 is between about 100° and 160°, and is most preferably between about 125° and 135°. Moreover, in order to insure that a requisite amount of the total bottom face is dedicated to serving as a stopping surface, the length of the distal bottom surface 29 is between about 50% to 100% of the length of the proximal bottom face 27, and is more preferably between about 60% and 80% of this length. In this particular preferred embodiment, the length of the distal bottom face 29 is approximately 70% of the length of the proximal bottom face 27. The front face 13, the top face 15, the back face 25, and the bottom faces 27,29 are all interconnected by substantially planar side faces 35a,b as shown. While the distal portion 19 of the top face 15 and the proximal bottom face 27 of the insert may seem to be parallel, they are canted 5° with respect to one another to more tightly fit in the clamping mechanism 5.

Figure 7A:
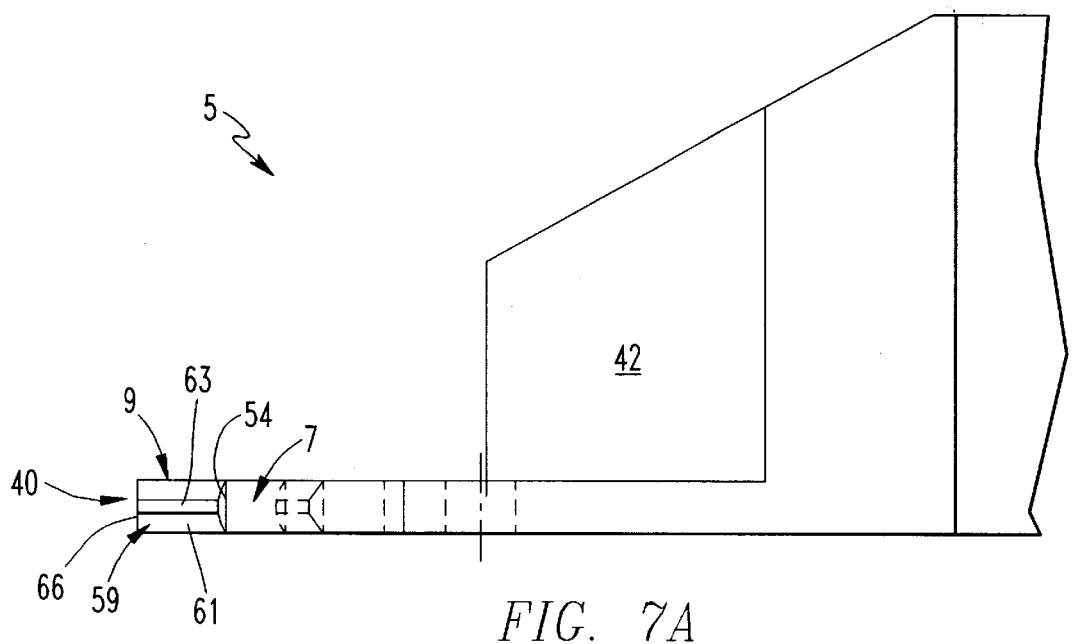
FIG. 7A is a top plan view of a first embodiment of the clamping mechanism of the cutting tool assembly.
Figure 7B:
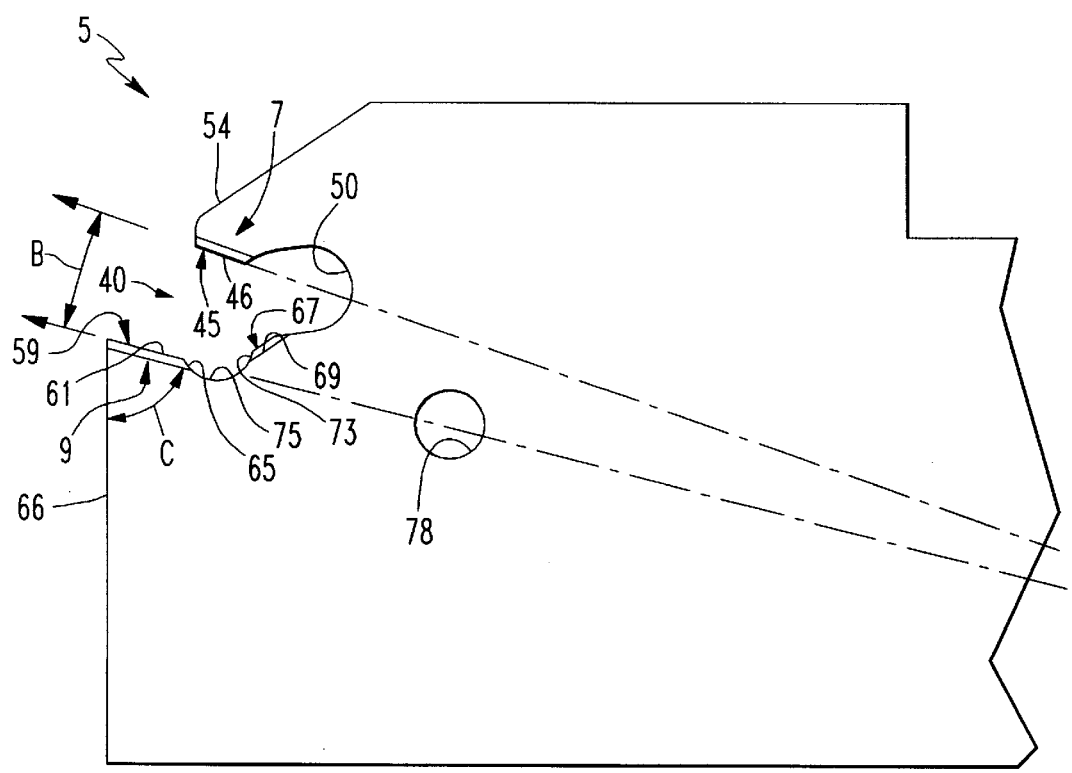
FIG. 7B is a side view of the clamping mechanism illustrated in FIG. 7A.

With reference now FIGS. 1, 7A and 7B, the first embodiment of the clamping mechanism 5 of the invention includes a blade-like insert holding portion 40 at one end, and a connecting block 42 at its other end. The connecting block 42 secures the cutting tool assembly to another tool (not shown) that extends and withdraws the insert 3 toward and away from a rotating workpiece (also not shown).

The upper clamping jaw 7 includes a top pocket surface 45 having a V-shaped rail 46 whose sides are complementary in shape to the V-groove 23 incorporated into the top face 15 of the insert 3. The V-shaped rail 46 may have a centrally located flat section 48 for preventing knife-edge contact from occurring between the center of the rail 46, and the vertex of the corresponding V-groove 23. Stated more positively, the presence of the flat section 48 insures the presence of surface-to-surface contact between the sides of the V-shaped rail 46, and the sides of the top V-groove 23 when the insert is received within the holding portion 40 of the clamping mechanism 5. The inner edge of the top pocket surface 45 terminates in a C-shaped cut-out portion 50 whose presence increases the resiliency between the integrally connected upper and lower jaws 7 and 9. The outer edge of the top pocket surface 45 terminates in the outer portion 54 of the upper jaw 7. Outer jaw portion 54 is tapered as shown in FIG. 7B to avoid interference with the formation and breaking of chips from a machining operation or the application of a stream of coolant (not shown) at the interface between the cutting edge 21 of the insert 3, and a rotating workpiece.

The lower clamping jaw 9 of the clamping mechanism 5 includes a proximal pocket surface 59 including a V-shaped rail 61 having a longitudinally oriented flat portion 63 for the same purpose as discussed with respect to the rail 46 of the top pocket surface 45. The proximal pocket surface 59 is disposed at an angle "C" with respect to front face 66 that is preferably less than 90°. The inner end of the proximal pocket surface 59 terminates in a tapered lead-in 65 (best seen in FIG. 1), while the outer end of the surface terminates in the front face 66 of the insert holding portion 40 of the clamping mechanism 5.

The lower clamping jaw 9 further includes a distal pocket surface 67 likewise including a V-shaped rail 69 having a longitudinally extending flat portion 71 for all the reasons given with respect to the V-shaped rail 46. The sides of the V-shaped rail 69 are, of course, complementary in shape to the V-groove 33 of the distal bottom face 29 of the insert 3. The outer end of the V-shaped rail 69 terminates in a tapered lead-in 73 (best seen in FIG. 1), while the outer end of this rail 69 terminates at the bottom of the C-shaped cut-out portion 50. As is clearly shown in FIGS. 1 and 7B, an arcuate recess 75 is disposed between the proximal and distal pocket surfaces 59 and 67 for facilitating the fabrication of the lower jaw 9 and for providing tool clearance. Together, the proximal and distal pocket surfaces 59 and 67 form a recess in the lower jaw 9 that is complementary in shape to the angular projecting portion 30 of the insert 3. While the grooves and rails in this preferred embodiment have been described as V-shaped, any one of the number of differently shaped rails and grooves, such as mateable convex and concave curved shapes, may be used to the same advantage.

Figure 8A:
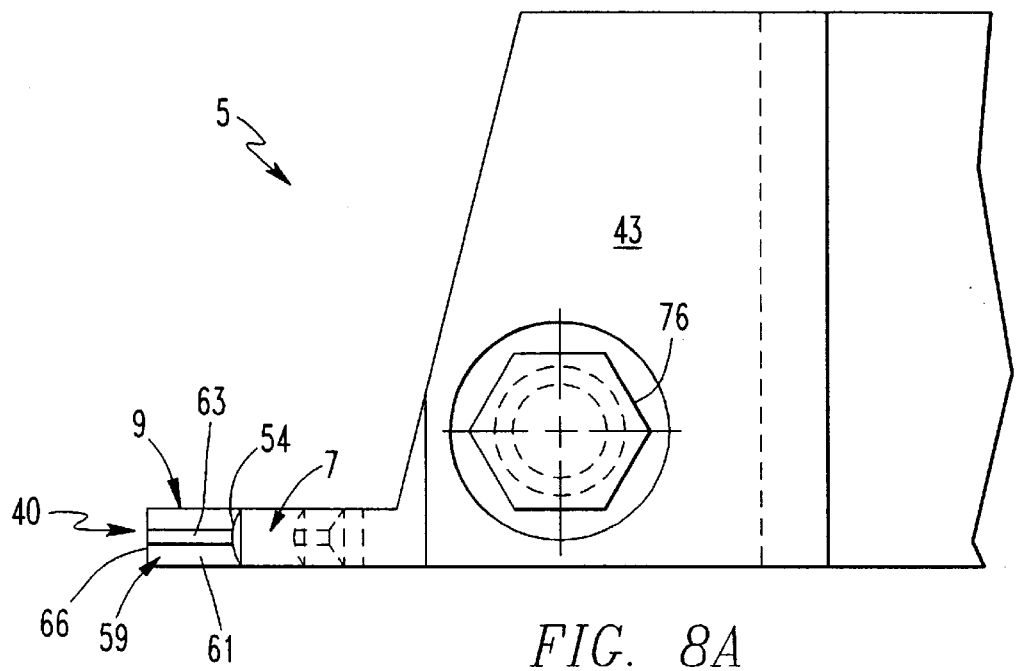
FIG. 8A is a top plan view of a second embodiment of clamping mechanism used in the cutting tool assembly of the invention.
Figure 8B:
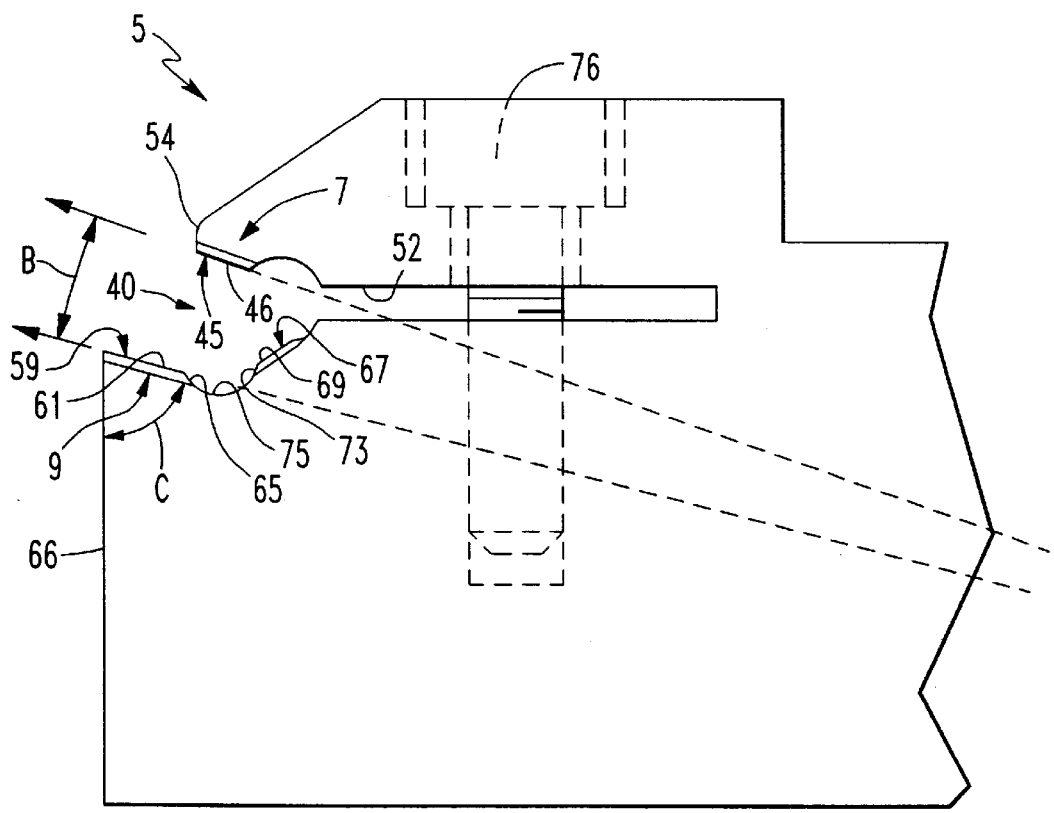
FIG. 8B is a side view of the clamping mechanism illustrated in FIG. 8A.

The embodiment of the clamping mechanism 5 illustrated in FIG. 8A and 8B is the same as the clamping mechanism 5 described with respect to FIGS. 1, 7A and 7B, with two exceptions. Firstly, instead of the previously described C-shaped cut-out portion 50 between the upper and lower jaws 7 and 9, the embodiment illustrated in FIGS. 8A and 8B includes an elongated slot portion 52 that extends into the connecting block 43. Secondly, a tightening bolt 76 is provided in the connecting block 43 across the elongated slot portion 52 for adjusting the clamping force that the jaws 7,9 apply to the insert 3. The FIGS. 8A and 8B embodiment of the clamping mechanism 5 is adapted for making relatively shallow grooves or cuts in a workpiece. While the provision of a tightening bolt 76 allows the jaws 7,9 to grip an insert 3 more tightly than the jaws 7,9 of the clamping mechanism 5 illustrated in FIGS. 7A and 7B, it also limits the distance to which the insert 3 may be extended into a cut in a workpiece.

In both of the embodiments of the clamping mechanisms 5 illustrated in FIGS. 7A, 7B, 8A and 8B, it should be noted that the top pocket surface 45 is not parallel with respect to the proximal pocket surface 59, but is instead cocked at a small angle B with respect to this surface. In the preferred embodiment, angle B is between 2° and 10°, and is more preferably about 4°. The presence of a small angle between the top pocket surface 45 of the upper jaw 7 and the proximal pocket surface 59 of the lower clamping jaw 9 allows the resilient jaws 7 and 9 to wedgingly and frictionally engage the distal portion 19 of the top face 15 and the proximal bottom face 27 of the insert 3 when it is manually inserted into the insert holding portion 40 of the mechanism 5. To obtain the full benefit of such wedging, frictional engagement, the distal portion 19 of the insert top face 15 and the proximal bottom face 27 of the insert 3 are likewise tilted at an angle that is preferably between about 2° and 10° from parallel, and is most preferably about 5° (or 1° greater than the angle B between the pocket surfaces of the jaws 7 and 9). Such angling results in secure contact between the upper and lower jaws 7,9 and the cutting insert 3 when the jaws 7,9 are resiliently spread apart incident to receiving the insert 3.

With reference now to FIG. 9, the insert 3 preferably includes a land 79 just behind the cutting edge 21 for defining a rake surface, and a chipbreaking groove 81 immediately behind the land 79. The back edge of the chip groove 81 terminates in a chipbreaking wall 83 which is elevated with respect to the cutting edge 21. During a cutting operation, the rake surface defined by the cutting edge 21 and land 79 directs a metal chip into the chip groove 81 which in turn curls it upwardly over the chipbreaking wall 83. The resulting curling and work-hardening of the metal forming the chip causes the chip to break into small segments which will not interfere with the cutting operation of the insert 3. However, the clamping arrangement of the subject invention would be equally effective for many cutting edge and chip control geometries and this configuration is presented only as one example of many possible configurations.

The operation of the cutting tool assembly 1 of the invention may best be understood with respect to FIG. 10. Prior to the machining operation, an insert 3 is manually pushed between the upper and lower jaws 7 and 9 of the clamping mechanism 5. An arm-like tool (not shown) that is pivotally insertable at one end into hole 78 may be used for this purpose in the FIGS. 7A and 7B embodiment of the clamping mechanism 5. The tightening bolt 76 may be loosened in the FIGS. 8A–8B embodiment of the clamping mechanism 5 to facilitate such manual installation. The resiliency of the integrally connected upper and lower jaws 7,9, coupled with the wedging effect that the previously discussed angle B between the top pocket surface 45 and the proximal pocket surface 59 securely clamps the insert within the jaws 7,9. This clamping force will be further increased in the FIGS. 8A–8B embodiment of the clamping mechanism 5 by tightening the bolt 76. Additionally, the interaction between the substantially complementarily shaped top and proximal V-grooves 23, 31 with the rail present in the top and proximal bottom pocket surfaces 45 and 59 helps to secure the insert 3 against lateral forces applied between the insert 3 and the clamping mechanism 5 incident to a cutting operation.

The insert 3 may be removed from the clamping mechanism 5 using the same arm-like tool. The insert 3 may be removed from the clamping mechanism 5 by loosening the tightening bolt 76 in the FIGS. 8A–8B embodiment.

When the insert 3 is pushed to the maximum desired extent between the upper and lower jaws 7,9, the distal bottom face 29 comes into firm and positive engagement with the distal pocket surface 67 of the lower jaw in both embodiments, as is illustrated in FIG. 10. When the cutting edge 21 is engaged against a rotating workpiece, a force represented by the vector F is generated. This force is applied at the cutting edge 21 in a direction of between about 15° to 45° from the front face 66 of the clamping mechanism 5. The most common directions of the force will be around 26° from the front face 66. The angle between the top pocket surface 45 and the distal bottom face 29 may be optimized to provide a positive stop but at the same time permit the component of the force to effectively urge the insert 3 into the clamping mechanism 5. This angle, D, is between 22° and 90°, and is more preferably between about 45° and 65°. In the particular preferred embodiment, the angle is 55°. The force generated through the cutting operation tend, in this fashion, to further secure the insert 3 within the clamping mechanism 5.

The orientation of proximal pocket surface 59 of the lower jaw 9 is such that the cutting force on the insert will push the insert 3 down and into the pocket against the distal pocket surface 67. The angle, E, between the proximal pocket surface 59 and the distal pocket surface 67 is between 100° and 160°. It is preferably between 125° and 135°. The most preferred angle is 130°.

The angularity between the surfaces 27 and 29 acts to deflect the insert 3 upwardly, thereby more tightly engaging the distal portion 19 of the insert front face 13 against the top pocket surface 45 of the upper jaw 7. Thus the distal pocket surface 67 of the lower jaw 9 simultaneously acts as a positive and dimensionally broad stop surface for the insert 3 while deflecting a component of the resultant force F into a tighter and more positive clamping force between the top portion 19 of the insert and the top pocket 45.

While various changes, modifications, and additions to the invention will become apparent to persons of skill in the art, all such changes, modifications, and additions are intended to be encompassed within the scope of this patent, which is limited only by the claims appended hereto.

What is claimed is:

1. A cutting tool assembly for performing cutting operations on a moving workpiece, comprising:

a cutting insert having front and top faces that define a cutting edge at an intersection thereof, a back face, and adjacent proximal and distal bottom faces contiguous with said front and back faces, respectively, that define an angular lower seating portion, and a clamping mechanism including upper and lower clamping jaws for receiving and resiliently securing said insert, said lower clamping jaw including proximal and distal pocket surfaces forming an angularly recessed jaw portion for receiving said proximal and distal bottom faces defining said angular lower seating portion of said insert, wherein the length of said distal bottom face of said insert is between about 50% to 100% the length of said proximal bottom face, and wherein said distal pocket surface constitutes a stop means for limiting the extent that said insert is received within said clamping jaws.

2. The cutting tool assembly of claim 1, wherein said upper clamping jaw includes a top pocket surface for receiving said top face of said insert, and one or both of said pocket surfaces of said clamping jaws or said top and bottom faces of said insert includes at least one groove, and one or both of said pocket surfaces of said clamping jaws or said top and bottom faces of said insert includes at least one rail receivable within said groove for providing lateral stability to the insert within said clamping mechanism.

3. The cutting tool assembly of claim 2, wherein said at least one groove and said at least one rail are V-shaped when viewed in cross-section.

4. The cutting tool assembly of claim 1, wherein said upper clamping jaw includes a pocket surface which is inclined between about 2° and 10° with respect to said proximal pocket surface of said lower clamping jaw such that said upper and lower clamping jaws wedgingly secure said insert therebetween.

5. The cutting tool assembly of claim 1, wherein said distal pocket surface is angled with respect to said proximal pocket surface for redirecting a component of said force to wedgingly engage said top face of said insert against a pocket surface in said upper clamping jaw.

6. The cutting tool assembly of claim 1, wherein said angularly recessed jaw portion of said clamping mechanism is substantially complementary in shape to said angular lower seating portion of said insert.

7. The cutting tool assembly of claim 1, wherein said lower clamping jaw includes a rounded recess between said proximal and distal pocket surfaces.

8. The cutting tool assembly of claim 1, wherein the clamping mechanism further includes a cut-out portion between said distal pocket surface of said lower clamping jaw and said top pocket surface of said upper clamping jaw for providing enhanced resiliency between said jaws.

9. The cutting tool assembly of claim 1, wherein said upper clamping jaw includes a tapered proximal end for facilitating chip removal and coolant access incident to a cutting operation.

10. The cutting tool assembly of claim 1, wherein said lower clamping jaw includes a front face oriented substantially vertically during a cutting operation, and wherein said proximal pocket surface is contiguous with said front face and oriented at an angle between about 75° and 85° thereto.

11. A cutting tool assembly for performing cutting operations, comprising:

a polygonal cutting insert having front and top faces that define a cutting edge at the intersection thereof, a back face, an adjacent proximal and distal bottom faces contiguous with said front and back faces, respectively, that define a projecting, angular lower seating portion, and a clamping mechanism for resiliently securing said insert including integrally connected upper and lower clamping jaws, said upper clamping jaw including a pocket surface for receiving said upper face of said insert, and said lower clamping jaw including proximal and distal pocket surfaces for receiving said proximal and distal bottom faces, respectively, wherein said distal pocket surface is oriented at a transverse angle with respect to said proximal pocket surface to act as a stop that limits the extent that said insert is received within said clamping jaws, and for redirecting a component of said force to wedgingly engage said top face of said insert against said pocket surface of said upper clamping jaw, and wherein said proximal and distal pocket surfaces of said lower clamping jaw portion of said clamping mechanism are complementary in shape to said projecting, angular lower seating portion of said insert, and the length of said distal bottom face of said insert is between about 60% and 80% of the length of said proximal bottom face.

12. The cutting tool assembly of claim 11, further comprising means for laterally stabilizing said insert within said jaws of said clamping mechanism including a groove in one or the other of said insert distal bottom face and said distal pocket surface of said lower jaw, and a complementary shaped rail in one or the other of said insert distal bottom face and said distal pocket surface of said lower jaw.

13. The cutting tool assembly of claim 11 further comprising means for laterally stabilizing said insert within said jaws of said clamping mechanism including a groove in one or the other of said pocket surfaces of said jaws or said top and bottom faces of said insert, and a rail insertable within said groove in one or the other of said pocket surfaces of said jaws or said top and bottom faces of said insert, whereby said insert is laterally stabilized.

14. The cutting tool assembly of claim 13 wherein said at least one groove and said at least one rail are V-shaped when viewed in cross-section.

15. The cutting tool assembly of claim 11, wherein said distal pocket surface is angled relative to said proximal pocket surface at an angle of between about 100° and 160°.

16. The cutting tool assembly of claim 11, wherein said pocket surface of said upper clamping jaw is inclined between about 2° and 10° with respect to said proximal pocket surface of said lower clamping jaw such that said upper and lower clamping jaws wedgingly secure said insert therebetween.

17. The cutting tool assembly of claim 11, wherein said lower clamping jaw includes a recess between said proximal and distal pocket surfaces for receiving said projecting, angular seating portion of said insert.

18. The cutting tool assembly of claim 11, wherein the clamping mechanism further includes a cut out portion between distal portions of said upper and lower clamping jaws for enhancing the resiliency of said jaws.

19. The cutting tool assembly of claim 11, wherein said upper clamping jaw includes a tapered proximal end for facilitating chip removal and coolant access incident to a cutting operation.

20. The cutting tool assembly of claim 11, wherein said lower clamping jaw includes a front face oriented substantially vertically during a cutting operation, and wherein said proximal pocket surface is contiguous with said front face and oriented at an angle between about 75° and 85° thereto.

21. A clamping mechanism for securing a cutting insert having front and top faces that define a cutting edge at an intersection thereof, a back face, and adjacent proximal and distal bottom faces contiguous with said front and back faces respectively that define an angular lower seating portion, comprising:

upper and lower clamping jaws for receiving and resiliently securing said insert, said lower clamping jaw including proximal and distal pocket surfaces forming an angularly recessed jaw portion for receiving said proximal and distal bottom faces defining said angular lower seating portion of said insert, wherein said distal pocket surface constitutes a stop for limiting the extent that said insert is received within said clamping jaws, and the length of said distal bottom face of said insert is between about 60% and 80% of the length of said proximal bottom face, and said distal and proximal bottom faces are oriented at an angle of between about 100° and 160°.

* * * * *